Figure 1:
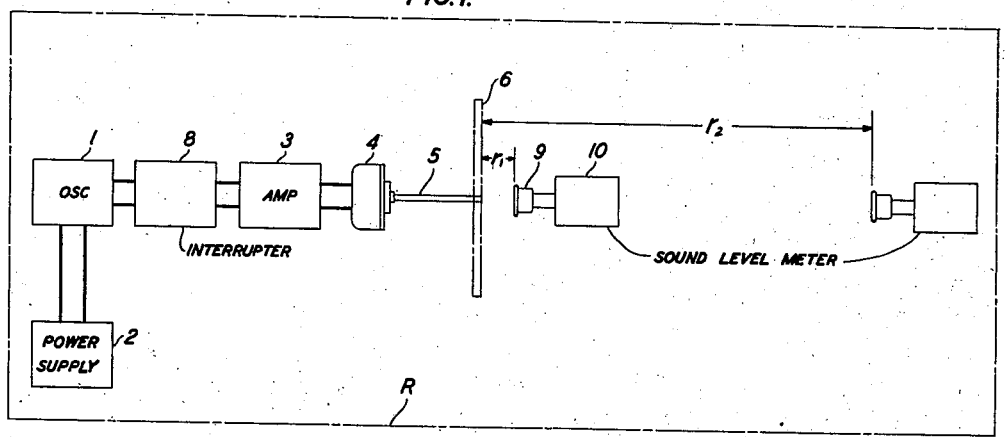

Aug. 22, 1944.   N. R. STRYKER   2,356,478
METHOD OF ACOUSTIC MEASUREMENT
Filed July 25, 1942

INVENTOR
N. R. STRYKER
BY
G. H. Hyatt
ATTORNEY

Patented Aug. 22, 1944

2,356,478

UNITED STATES PATENT OFFICE 2,356,478

METHOD OF ACOUSTIC MEASUREMENT

Norman R. Stryker, Maplewood, N. J., assignor to Bell Telephone Laboratories, Incorporated, New York, N. Y., a corporation of New York Application July 25, 1942, Serial No. 452,377

6 Claims. (Cl. 181—0.5)

This invention relates to a method for making acoustic determinations, particularly those in which the results of procedures heretofore in use are rendered untrustworthy by reason of the existence of standing sound waves. As applied, for example, to the acoustic survey of a room, the method of the present invention requires that a short sound pulse be generated and the resulting energy densities be measured at two points in the room. The ratio of these energy densities substituted in an equation permits immediate computation of the room's average absorption coefficient.

A majority of the acoustic measurements now made in studies of microphones, loud-speakers, acoustic materials, etc. are dependent upon the use of sustained tones in a room during the period of measurement. An outstanding problem encountered in such studies, and one which is receiving a great amount of attention in acoustic laboratories, is that of eliminating or reducing the effect of the resulting interference patterns. While many methods of accomplishing this end have been tried, namely, rotation of source or microphone or both, "warbling" the frequency, rotating vanes, etc., the only approach to a satisfactory solution has been the use of highly absorbent materials on the room surfaces. This treatment is always expensive and in many cases impracticable to apply. The net result is unreliable data and failure among different laboratories to obtain comparable results from similar tests.

Experimental work has shown that if a very short sound pulse is generated in an enclosure, the energy density thereby created at any point in the enclosure may be measured by conventional sound level meters with results closely in agreement with theoretical predictions based on the assumption of a steady state condition and the absence of standing waves. It is, accordingly, an object of the present invention to provide a method of acoustic measurement in which the effect of standing waves is eliminated. The method is applicable to the calibration of acoustic instruments, such as loud-speakers and microphones, to the determination of the absorption versus frequency characteristics of rooms, to the investigation of acoustic materials, and to other uses which will readily occur to those skilled in the art.

Since the method to be described does not require the careful acoustic treatment heretofore considered necessary for the walls of the measuring room, another object of the invention is to render such treatment unnecessary. Further, since by the proposed technique, the time required for an acoustic survey is reduced from hours to minutes, economy of time is a third object of the invention.

Moreover, for absorption studies the absolute strength of the generated sound pulse need not be known, since the acoustic quantity to be measured is determined from the ratio of two simultaneous or successive measurements different distances from the sound source. Therefore, a fourth object of the invention may be stated, namely, to provide a method of measuring acoustic absorption which does not require knowledge of the intensity of the sound source.

Figure 2:
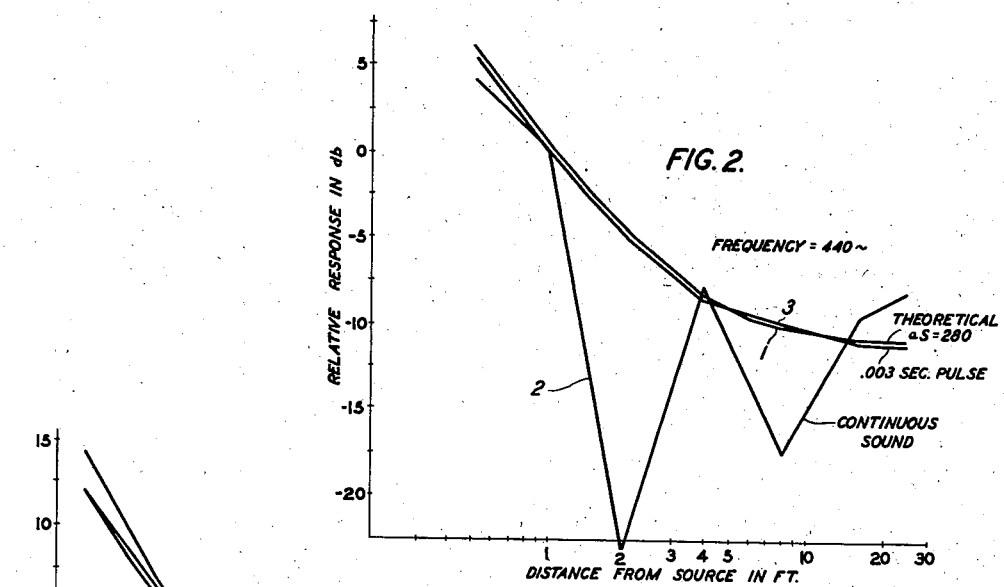
Figure 3:
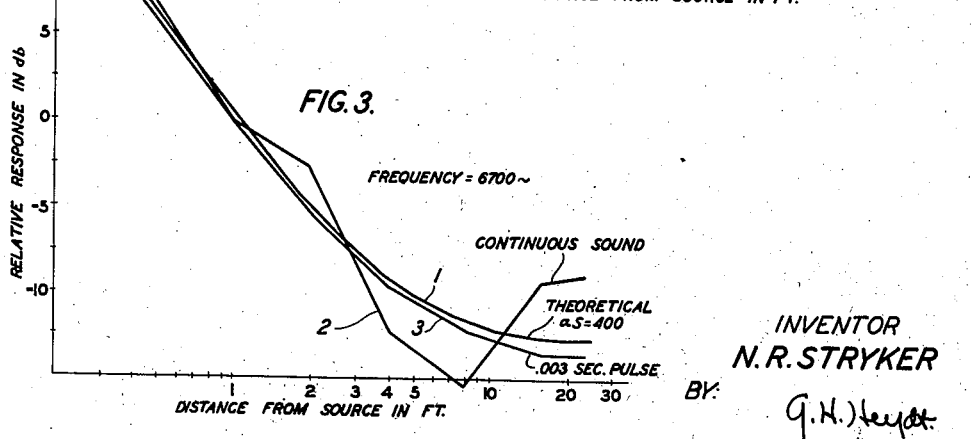

The invention will be understood from the following description read with reference to the accompanying drawing, in which:

Fig. 1 shows schematically the arrangement of the required apparatus in an enclosure to be studied;

Fig. 2 shows curves exhibiting relative measured energy densities as a function of distance from the sound source in a room of low absorption for continuous sound of frequency 440 cycles per second and for sound pulses of that nominal frequency of 3 milliseconds duration compared with the theoretical curve for a continuous 440-cycle signal neglecting standing waves; and Fig. 3 shows curves similar to those of Fig. 2 for the same room but for sound of frequency 6700 cycles per second.

Referring to Fig. 1, in room R, oscillator 1, supplied from power supply 2, is tuned to generate currents of a desired frequency which are amplified by amplifier 3 and converted into sound waves by loud-speaker 4, preferably directly connected to pipe 5, of a diameter small enough in comparison with the emitted acoustic wave-length to be considered a point source of sound. It is sometimes convenient, though unnecessary, to terminate pipe 5 in baffle 6 as indicated by dotted lines in Fig. 1. Continuous sound waves are emitted from orifice 7 of pipe 5 and these waves may be made single or successive sound pulses by the operation of interrupter 8 which may, of course, be arranged to permit the emission of sound pulses of any desired duration. The sound pulse emitted from orifice 7 is received by microphone 9 with which is suitably associated sound level meter 10. Two positions are shown for microphone 9 and meter 10 corresponding to distances $r_1$ and $r_2$, respectively, from sound source 7, as will be later explained.

The choice of particular apparatus elements may be left to the user but loud-speaker 4 is suitably a Western Electric 555-W receiver, while microphone 9 and associated meter 10 may be of the apparatus group known as the Western Electric RA-281 sound level meter. For interrupter 10 any design may be used which is capable of closing the circuit from the oscillator to the amplifier for a time interval of from 2 to 5 milliseconds or longer if desired.

Figs. 2 and 3, selected from a mass of similar data, shows the applicability of the method to measure the average absorption coefficient of a reverberant room. In each figure curve 1 represents the relative energy density versus distance from sound source predicted from theory for continuous sound emission in disregard of standing waves. Curve 2 shows how the actual measured relative energy densities for continuous emission differ conspicuously from theoretical curve 1 by reason of the standing waves. Curve 3, nearly coincident with curve 1, exhibits the relative energy densities at various distances from the source of sound produced by pulses lasting 3 milliseconds. For the sake of legibility, curves similar to curve 3 but for other pulse durations are omitted. Such curves have shown a closer and closer approach to coincidence with curve 1 as the pulse duration is decreased.

It is, of course, desirable that the indications of sound level meter 10 be uninfluenced by the ballistic characteristic of the indicating instrument, a requirement met by the RA–281 meter above mentioned. However, since only relative measurements are necessary, this requirement is not essential provided the meter deflections for sound pulses are uniformly related to the deflections for continuous sound waves.

Curves 1 of Figs. 2 and 3 are computed as follows:

$$E = \frac{p^2_{max}}{2\rho c^2} \quad (1)$$

where $E$ is the energy density at any point, of the sound wave which produces at that point the excess pressure $p$ max; $\rho$ is the density of the medium; and $c$ is the velocity of sound (Crandall, "Theory of Vibrating Systems and Sound," page 120, New York, 1926). Effectively, the quantity $E$ is measured by sound level meter 10.

At any point $p$ distant $r$ from a point sound source in a room of average absorption coefficient $\alpha$ per unit of surface the energy density $E_p$ is given by the equation:

$$E_p = \frac{P}{4\pi r^2 c} + \frac{4P(1-\alpha)}{\alpha S c} \quad (2)$$

where $P$ is the rate of uniform energy emission from the source and $S$ is the surface area of the room. The first term on the right of Equation (2) is due to the directly received sound; the second term is due to sound reflected from the walls of the room after a steady state has been reached (Olson and Massa, "Applied Acoustics," page 339, Philadelphia, 1934). Writing Equation (2) in the form $$E_p = K\left[\frac{1}{r^2} + \frac{16\pi(1-\alpha)}{\alpha S}\right] \quad (2')$$

it is clear that taking the ratio of the energy densities measured at two points $p_1$ and $p_2$, distant respectively $r_1$ and $r_2$ from the sound source, one may compute the average absorption coefficient $\alpha$. It can be shown that for the case of a baffle large enough to confine the sound emission to a hemisphere, the direct sound energy is twice that given in the first term on the right of Equation (2), so that in Equation (2') the second term on the right becomes $$\frac{8\pi(1-\alpha)}{\alpha S}$$

for this condition, $K$ becoming say $K'$.

The sound energies indicated by sound level meters are usually read in terms of decibels above a stated reference level. The difference between the indications of such a meter at points $p_1$ and $p_2$, respectively, is a logarithmic expression for the ratio of the energy densities at those points. If $p_1$ is nearer the source than $p_2$, we have $$B = 10 \log \frac{E_{p_1}}{E_{p_2}} \quad (3)$$

and if $E_{p_1} = R E_{p_2}$, we write Equation (3) as $$B = 10 \log R \quad (3')$$

From Equation (2') we obtain for a point source of sound $$R = \frac{\frac{1}{r_1^2} + \frac{16\pi(1-\alpha)}{\alpha S}}{\frac{1}{r_2^2} + \frac{16\pi(1-\alpha)}{\alpha S}} \quad (4)$$

from which follows $$\alpha = \frac{16\pi(1-R)r_2^2 r_1^2}{S(Rr_1^2 - r_2^2) + 16\pi(1-R)r_2^2 r_1^2} \quad (5)$$

The total absorption, $A$, of the room is, of course, $\alpha S$.

The foregoing computation is valid for continuous sound waves provided that the measured values of energy density are not corrupted by standing wave patterns such as are always present unless extreme precautions are taken to eliminate reflections from the walls of the enclosure. Such elimination of reflections destroys the possibility of measuring the absorption coefficient of the room.

In each of Figs. 2 and 3, curves 2 show by comparison with curve 1, the effect of standing waves for each type of measurement represented by curves 2 and 3. In each figure sound levels were measured at a plurality of points clustered about a mean position the distance of which from the source is an abscissa of the curve. The average absorption coefficient of the room, which had in this investigation a volume of about 10,000 cubic feet, was determined for each frequency by the conventional reverberation time method. The total absorption ($\alpha S$) of the room was, for 440 cycles 280 sabines; for 6700 cycles 400 sabines. In these observations, pipe 5 was provided with baffle 6.

The close agreement of curves 1 and 3, repeatedly observed in other measurements, suggests the method of the present invention which may be stated thus.

1. The generation of a short sound pulse of a desired nominal frequency and of convenient intensity;

2. Measurements, either simultaneously by two similar measuring systems or successively by the same system, of the energy densities due to the pulse at two or more known distances from the sound source;

3. Substitution in Equation (5) of the ratio of any two of these measured energy densities together with the corresponding distances from the source and surface area $S$ wherefrom the average absorption coefficient $\alpha$ may be computed.

For a room of 10,000 cubic feet volume a convenient duration of the sound pulse is 3 milliseconds at all nominal frequencies to be investigated, while distances $r_1$ and $r_2$ are appropriately taken 1 foot and 16 feet from the sound source, respectively. In larger rooms the pulse durations may be increased. A rough rule is as follows: Volume of room in cubic feet divided by pulse duration in seconds = 3,000,000. Distances $r_1$ and $r_2$ may be increased in proportion to the long dimension of the room, maintaining these distances in the convenient ratio of 10 or 20 to 1. It is, of course, requisite that the more distant point be not close to reflecting surfaces which are capable of producing virtual images of the sound source.

It is, of course, preferable that the average be taken of a plurality of observations clustered about each of the points at distances $r_1$ and $r_2$, respectively, from the sound source. It is also to be borne in mind that a short sound pulse cannot be considered a sound wave of only the nominal frequency corresponding to the setting of oscillator 1. Actually such a pulse consists of a frequency spectrum, the maximum of which is centered at the nominal frequency. If the frequency spread of the pulse is defined as the difference between the frequencies for which the amplitude is half the maximum, it can be shown that this spread is approximately inversely proportional to the pulse duration at all frequencies. For the 3-millisecond pulse proposed above the frequency spread is 400 cycles. Accordingly, the method of the present invention permits the observer to obtain the absorption coefficient averaged over a frequency interval of 400 cycles and not the coefficient pertaining strictly to the central frequency of the pulse. For all practical purposes of architectural acoustics, the average coefficient over such a frequency interval is sufficient. The present method and arrangement besides eliminating the effect of standing waves reduce the time required for the acoustic survey of a room to one-tenth that needed when conventional methods are used.

To illustrate the adequacy of the method of the invention, the table below exhibits a comparison for three frequencies of the room absorption in sabines obtained by the present method with that obtained by the usual reverberation time method for the room to which relate the curves of Figs. 2 and 3, a room of low absorption.

| Frequency cycles per second | Absorption by— | |
|---|---|---|
| | Pulse method | Reverberation time method |
| 440 | 278 | 280 |
| 1,500 | 270 | 270 |
| 6,700 | 405 | 400 |

The values tabulated in the second column of the table were obtained by averaging several observations at distances $r_1=1$ foot, $r_2=16$ feet.

Similar measurements in a highly damped room showed noticeable disagreement between the pulse determinations and those by the reverberation time method only at the lowest tested frequency, 460 cycles per second in this case. It is known that the reverberation time method is least trustworthy under such conditions, being dependent upon the distribution of absorbing material in the room and upon the manner of obtaining and interpreting the decay curves.

If it is desired to measure the sound absorption of an acoustic material, this obviously may be done by the sound pulse method, measuring the room absorption before and after installation of the material to be tested or the measurement of a panel of the test material in a highly reverberant room as is the usual practice when the reverberation time method is relied upon. Finally, from what has been said, it will be clear that the method of the invention permits rapidly making acoustic measurements exempt from contamination by standing sound waves, and that the method is applicable to the acoustic survey of enclosures whether reverberant or not, to the determination of the sound absorbing properties of acoustic materials, and to the calibration of microphones and loud-speakers, in each case with the advantage of improved accuracy and greater speed as compared with the methods of the prior art.

What is claimed is:

1. In determining the acoustic absorption of an enclosed space of known surface area, the method of eliminating from said determination the effect of standing sound waves in said space which comprises generating a short sound pulse at a selected point in said space, measuring the relative energy densities produced by said pulse at a plurality of points in said space unequally distant from said selected point, measuring the distances of said points from said selected point and computing said absorption from a formula involving only said area, said distances and said relative densities.

2. The method of measuring the total acoustic absorption of an enclosure which comprises generating at a point in said enclosure a short sound pulse, measuring the acoustic energy density produced by said pulse at each of two other points in said enclosure, measuring the distance of each of said other points from said point, taking the ratio of said measured energy densities and computing the total absorption of said enclosure from the equation $$A = \frac{16\pi(1-R)r_2^2 r_1^2 S}{S(Rr_1^2 - r_2^2) + 16\pi(1-R)r_2^2 r_1^2}$$

where $A$ is said total absorption, $S$ is the surface area of said enclosure, $R$ is said ratio and $r_2$ and $r_1$ are respectively the distances of the first and of the second of said other points from said point.

3. The method of claim 2, wherein the duration of said pulses is of the order of 3 milliseconds.

4. The method of claim 2, wherein the duration of said pulse is of the order of 3 milliseconds and the distances of said other points from said point are of the order of 1 foot for the first of said other points and 20 feet for the second of said other points.

5. The method of measuring the total acoustic absorption of an enclosure which comprises generating at a point in said enclosure a hemispherical sound pulse, measuring at a second and a third point in said enclosure the energy density produced thereat by said pulse, measuring the distances of said second and of said third points from said point, and computing the total acoustic absorption of said enclosure from the equation $$A = \frac{8\pi(1-R)r_2^2 r_1^2 S}{S(Rr_1^2 - r_2^2) + 8\pi(1-R)r_2^2 r_1^2}$$

wherein $A$ is said absorption, $S$ is the surface area of said enclosure, $R$ is the ratio of the energy density at said second point to the energy density at said third point, and $r_2$ and $r_1$ are respectively the distances of said third and said second points from said point.

6. The method of claim 5, wherein the duration of said pulse is of the order of 3 milliseconds and the distance of said third point from said point is of the order of twenty times the distance of said second point from said point.

NORMAN R. STRYKER.